United States Patent
Goyal et al.

(10) Patent No.: US 11,537,785 B1
(45) Date of Patent: Dec. 27, 2022

(54) SPREADSHEET FLAT DATA EXTRACTOR

(71) Applicant: SAP SE, Walldorf (DE)

(72) Inventors: Kanupriya Goyal, Bengaluru (IN); Swagath, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/375,823

(22) Filed: Jul. 14, 2021

(51) Int. Cl.
*G06F 40/18* (2020.01)
*G06F 16/22* (2019.01)
*G06F 16/25* (2019.01)

(52) U.S. Cl.
CPC .............. *G06F 40/18* (2020.01); *G06F 16/22* (2019.01); *G06F 16/254* (2019.01)

(58) Field of Classification Search
None
See application file for complete search history.

(56) References Cited

U.S. PATENT DOCUMENTS

| | | | | |
|---|---|---|---|---|
| 2004/0172590 | A1* | 9/2004 | Rothschiller | G06F 40/143 715/212 |
| 2015/0033116 | A1* | 1/2015 | McKinney | G06F 40/258 715/239 |
| 2017/0116172 | A1* | 4/2017 | Mungi | G06F 40/18 |
| 2017/0286386 | A1* | 10/2017 | Goto | G06F 40/177 |
| 2020/0067789 | A1* | 2/2020 | Khuti | G06F 16/254 |
| 2020/0233600 | A1* | 7/2020 | Swamy | G06N 20/00 |
| 2020/0279308 | A1* | 9/2020 | Pabby | G06Q 30/04 |
| 2021/0042309 | A1* | 2/2021 | Mustafi | G06F 16/258 |
| 2021/0073290 | A1* | 3/2021 | Hunter | G06N 3/0454 |

OTHER PUBLICATIONS

Sou-Nan-De-Gesu, Use openpyxl, Convert to DataFrame in Pandas, Oct. 13, 2018, pp. 1-5, retrieved: https://www.soudegesu.com/en/post/python/pandas-with-openpyxl/ (Year: 2018).*

Geeksforgeeks, Split large Pandas Dataframe into list of smaller Dataframes, Sep. 5, 2020, retrieved:https://www.geeksforgeeks.org/split-large-pandas-dataframe-into-list-of-smaller-dataframes/(Year: 2020).*

(Continued)

*Primary Examiner* — Howard Cortes
(74) *Attorney, Agent, or Firm* — Fountainhead Law Group P.C.

(57) ABSTRACT

Systems and methods extract flat data units from a non-flat input, such as a spreadsheet comprising tables organized according to a hierarchy. First, the non-flat input is read (e.g., using pandas in combination with openpyxl) to create a flat dataframe comprising the content of the non-flat input. Next, individual flat data units (e.g., spreadsheet tables) are recognized and split from the dataframe based upon the appearance of blank rows and/or columns. Headers present in the flat data units are determined (e.g., based upon alphabetic cell text, bolded cell text, and/or early position of the cell in a column), and then connections between the flat data units are identified. Based upon the connections, individual flat data units are merged together. The resulting merged flat data units are subsequently available for consumption, for example user reports of content, and/or conversion to a new non-flat format (e.g., relational database schema).

19 Claims, 18 Drawing Sheets

(56) References Cited

OTHER PUBLICATIONS

Geeksforgeeks, Combine Multiple Excel Worksheets Into a Single Pandas Dataframe, Sep. 5, 2020, retrieved: https://www.geeksforgeeks.org/combine-multiple-excel-worksheets-into-a-single-pandas-dataframe/ (Year: 2020).*

Stackoverflow, split dataframe by empty row and reshape by headers, Sep. 19, 2017 retreived:https://stackoverflow.com/questions/46305715/split-dataframe-by-empty-row-and-reshape-by-headers (Year: 2017).*

Carsen Sandtner, Pandas has superpowers in reading Excel files, Towards data Science, Sep. 17, 2020: retrieved:https://towardsdatascience.com/pandas-has-superpowers-in-reading-excel-files-44344bfdaac (Year: 2020).*

Suraj Gurav, Join the Tables Understanding the merge( ) and the concat( ) in Python pandas, Towards Data Science, Jun. 30, 2020 retrieved:https://towardsdatascience.com/join-the-tables-ab7fd4fac26b (Year: 2020).*

Anirudh Nanduri, Different ways to create, subset, and combine data frames using pandas, Towards Data Science, May 18, 2020 Retrieved:https://towardsdatascience.com/different-ways-to-create-subset-and-combine-dataframes-using-pandas-e7227330a7f1 (Year: 2020).*

* cited by examiner

```
*    def _open_file_and_get_dataframe(self, document_content):
    """
    Gets dataframe out of excel file content
    Preventing API from abusive usage, Supporting excel of dimension MAXIMUM_ROW_LENGTH *
MAXIMUM_COLUMN_LENGTH
    tempfile: read_excel method needs filepath to load the file, so temporarily storing the byte object in file\
    which will be deleted after processing
    """
    with tempfile.NamedTemporaryFile() as temporary:
        temporary.write(document_content)
        dataframe = pandas.read_excel(str(temporary.name), index=False,
                                     usecols=const.MAXIMUM_COLUMN_INDICES, header=None,
                                     nrows=const.MAXIMUM_ROW_LENGTH)
    return dataframe
```

FIG. 3

| | 0 | 1 | ... | 24 | 25 |
|---|---|---|---|---|---|
| 0 | Account | Branch | ... | NaN | NaN |
| 1 | 80417 | NaN | ... | NaN | NaN |
| 2 | 80417 | NaN | ... | NaN | NaN |
| 3 | 80417 | NaN | ... | NaN | NaN |
| 4 | 80417 | NaN | ... | NaN | NaN |
| 5 | 80417 | NaN | ... | NaN | NaN |
| 6 | 80417 | NaN | ... | NaN | NaN |
| 7 | 80417 | NaN | ... | NaN | NaN |
| 8 | 80417 | NaN | ... | NaN | NaN |
| 9 | 80417 | NaN | ... | NaN | NaN |
| 10 | 80417 | NaN | ... | NaN | NaN |
| 11 | 80417 | NaN | ... | NaN | NaN |

FIG. 4

```
from openpyxl import *
from openpyxl.styles import *
wb=load_workbook(temporary.name)
ws = wb.active
```

FIG. 5

```
from enum import Enum class SeparationType(Enum):

COLUMN = "COLUMN",
    ROW = "ROW"
```

| OrderD | Region | Rep | | OrderD | Region | Rep |
|---|---|---|---|---|---|---|
| ##### | East | Jones | | | | |
| 1/23/20 | Central | Kivell | | ##### | East | Jones |
| ##### | Central | Jardine | | 1/23/20 | Central | Kivell |
| 2/26/20 | Central | Gill | | ##### | Central | Jardine |
| | | | | 2/26/20 | Central | Gill |
| | | OrderD | Region | Rep | | |
| | | ##### | East | Jones | | |
| | | 1/23/20 | Central | Kivell | | |
| | | ##### | Central | Jardine | | |
| | | 2/26/20 | Central | Gill | | |

FIG. 8

| OrderD | Region | Rep | | | | |
|---|---|---|---|---|---|---|
| ##### | East | Jones | | | | |
| 1/23/20 | Central | Kivell | | | | |
| ##### | Central | Jardine | | | | |
| 2/26/20 | Central | Gill | | | | |
| | | | | OrderD | Region | Rep |
| | | | | ##### | East | Jones |
| OrderD | Region | Rep | | 1/23/20 | Central | Kivell |
| ##### | East | Jones | | ##### | Central | Jardine |
| 1/23/20 | Central | Kivell | | 2/26/20 | Central | Gill |
| ##### | Central | Jardine | | | | |
| 2/26/20 | Central | Gill | | | | |

FIG. 9

• def get_null_column(, dataframe: pandas.DataFrame) -> List[n]:
    null_columns: List = dataframe.columns[dataframe.isnull().all()].tolist()
    return null_columns

FIG. 10

• def get_dataframe_value(parent_dataframe: pandas.DataFrame, excel_dataframe: ExcelDataframe) -> pandas.DataFrame:
    pandas_dataframe = parent_dataframe.iloc[excel_dataframe.row_range.start_index:excel_dataframe.row_range.end_index, excel_dataframe.column_range.start_index:excel_dataframe.column_range.end_index]
    return pandas_dataframe

```python
def split_excel_dataframe(self, parent_dataframe: pandas.DataFrame) -> List[ExcelDataframe]:
    """
    Checking for empty column and row
    """
    split_dataframes: List = []
    dataframes_queue = queue.Queue()
    """
    This would create single dataframe of entire excel sheet starting from
    row zero.
    """
    initial_dataframe = ExcelDataframeWithSeperationType(dataframe_name=None,
                            row_range=Range(parent_dataframe.head(1).index[0],
                                    parent_dataframe.shape[0]),
                            column_range=Range(parent_dataframe.columns.get_loc(
                                    parent_dataframe.columns[0]),
                                    parent_dataframe.shape[1]),
                            separation_type=None)
    dataframes_queue.put(initial_dataframe)
    frame_count = 1
    # traverse the queue with all the dataframes
    while dataframes_queue.qsize() > 0:
        excel_dataframe = dataframes_queue.get()
        temporary_dataframe = get_dataframe_value(parent_dataframe, excel_dataframe)
        separation_result = self._separate(excel_dataframe, temporary_dataframe)
        if separation_result.is_split:
            self.add_split_dataframes_to_queue(dataframes_queue, separation_result.split_table_ranges,
                            excel_dataframe, separation_result.separation_type)
        else:
            metalist_tables = ExcelDataframe(
                dataframe_name=const.DATAFRAME_NAME_TEMPLATE.format(frame_count),
                row_range=excel_dataframe.row_range,
                column_range=excel_dataframe.column_range)
            frame_count = frame_count + 1
            split_dataframes.append(metalist_tables)
    return split_dataframes
```

FIG. 11

| | Electronice Payment Invoice | | | | |
|---|---|---|---|---|---|
| | 1235AB_1237_Xlm23 | | | | |
| | Invoices | | | | |
| | Document Number in fc | Invoice Number | Invoice Date | Description | Invoice Amount in fc | Invoice Currency |
| | 78691765 | 5007047016 | 26/6/2018 | 6B1573OX/MXP3/ | 19042.59 | EUR |
| | 78691765 | 5007047015 | 26/6/2018 | 873PQ1JSQ/MXP3/ | 2436 | EUR |
| | 78691765 | 5007047862SC | not found | Shortage Claim for Invoice | -98.35 | EUR |
| | 78691765 | 5007047862 | 27/6/2018 | 2G95KBZF/FC01/ | 1592.53 | EUR |
| | 78691765 | 5007047858 | 27/6/2018 | 3R5LIIYF/FC01/ | 1587.49 | EUR |
| | 78691765 | 5007047853 | 27/6/2018 | 2LZZJFZO/FC01/ | 2723.94 | EUR |
| | 78691765 | 5007047848 | 27/6/2018 | 6YWBM4W1/FC01/ | 861.04 | EUR |
| | 78691765 | 5007047842 | 27/6/2018 | 3D4HQ73C/FC01/ | 2073.51 | EUR |
| | 78691765 | 5007047840 | 27/6/2018 | 5U26XJRL/FC01/ | 4071.6 | EUR |
| | 78691765 | 5007047872 | 27/6/2018 | 8316MR6F/MXP3/ | 1338.43 | EUR |
| | 78691765 | 5007047846 | 27/6/2018 | 1D9M3LJ8H/FC01/ | 3885.57 | |
| | 78691765 | 5007047855 | 27/6/2018 | 4QB0765X/FC01/ | 39697.42 | |
| | 78691765 | 5007047850 | 27/6/2018 | 4G5TR2GB/FC01/ | 14871.13 | |
| | 78691765 | 5007047854 | 27/6/2018 | 7SPJVEJ8/FC01/ | 517.16 | |
| | 59D8JGOX/MXP5/ | | ARETS | 10Q91VGE/MXP5/ | | 28/6/2018 | ARETS |
| | 7MNDK5FV/MXP5/ | | ARETS | 8LJKDXYNM/MXP5/ | | 28/6/2018 | ARETS |
| | 5SC79ES5/MXP5/ | | ARETS | 6K3I5ILUW/MXP3/ | | 28/6/2018 | ARETS |
| | 6N8LA8ZC/MXP5/ | | ARETS | 48JCJ4AFN/MXP5/ | | 28/6/2018 | ARETS |
| | 8AZ3D7WM/MXP5/ | | ARETS | 8AZ3D7WM/MXP5/ | | 28/6/2018 | ARETS |

FIG. 12

| Withholding Amount | Terms Discount Taken | |
|---|---|---|
| 0 | 0 | 19042.59 |
| 0 | 0 | 2436 |
| 0 | 0 amt 233 | |
| 0 | 0 | 1591.53 |
| 0 | 0 | 1587.49 |
| 0 | 0 | 2723.94 |
| 0 | 0 | 861.04 |
| 0 | 0 | 2073.51 |
| 0 | 0 | 4071.6 |
| 0 | 0 | 1338.43 | table 1

| | | |
|---|---|---|
| 0 | 0 | 3685.57 |
| 0 | 0 | 39697.42 |
| 0 | 0 | 14871.13 |
| 0 | 0 | 517.16 | table 3

FIG. 12A

Step 1: Iterate each table one after the another using for loop

Step2: Calculate the row_limit (number of rows to be iterated to fetch line item header)

If table length > 15:

row_limit = 10 else:

row_limit = (row_end_index – row_start_index)*0.75

Step3: Iterate each row of the table till row_limit and check if the row is eligible to be line item row For the row, eligible to be line item header At least 75% of row should have values and all the data of the row should be String with maximum 2 numbers.

Eg: DocumentNumber, Doc Num 1, Amount, Amount1

Step4: If the row is eligible to be line item add the row number to line_item_row_list.

Step5: Follow the step 3 and 4 for maximum 15 rows of the large table. If the table length is less than 20 rows repeat the step for 75% rows of the table.

Step6: Iterate the elements of line_item_row_list.

If the row has data in bold.

It is considered as table line_item_row and break the loop

Step7: If the line_item_row is not found in step6 then consider the 1st row of the list as line_item_row Step8: Repeat the steps for all tables. Line_item header row will be found for all table.

```
import re
import numpy as np
import datetime def is_data_string(data: str) -> bool:
    """
    :param data: string value
    :return: False if the value can be parsed to int/float/date
    """
    try:
        int(data)
        return False
    except (ValueError, TypeError, Exception):
        try:
            float(data)
            if float(data).isnan():
                raise ValueError
            return False
        except (ValueError, TypeError, Exception):
            try:
                if isinstance(data, (datetime.datetime, datetime.datetime)):
                    return False
                else:
                    parse(data, fuzzy=False)
                    return False
            except (ValueError, TypeError, Exception):
                if len(re.sub('[0-9]', '', data.replace(" ", ""))) / len(data) > 0.3:
                    return False
                try:
                    if np.datetime64(data):
                        return False
                except (ValueError, TypeError, Exception):
                    return True
```

```
def find_eligible_line_item_rows(excel_dataframe, pandas_dataframe,
                headers_to_be_extracted,
                line_items_to_be_extracted,
                detected_languages):
    """
    We find the list of rows that are eligible to be line item row """
    dataframe_row_start_index = excel_dataframe.row_range.start_index
    dataframe_row_end_index = excel_dataframe.row_range.end_index
    dataframe_length = dataframe_row_end_index - dataframe_row_start_index if dataframe_length >= 20:
        row_end_index = dataframe_row_end_index
    else:
        row_end_index = round(dataframe_row_end_index * 0.8)
    line_item_list = None
    for current_row in range(dataframe_row_start_index, row_end_index):
        pandas_data = list(pandas_dataframe.iloc[current_row])
        all_values_string = True
        is_all_value_None = True for values in pandas_data:
            if not ((isinstance(values, np.float64) or isinstance(values, float)) and pandas.isnull(
                    values)) and values is not None:
                is_all_value_None = False if not is_data_string(values):
                all_values_string = False
                break if all_values_string and not is_all_value_None:
            # check if the values are bod
            line_item_list = current_row
    return line_item_list
```

FIG. 14A

```python
def _detect_line_item_row(excel_dataframe, line_item_list):
    """
    Here we extract the line item row from the eligible row index list
    """
    is_line_item_row = False
    row_index = line_item_list for column_index in range(excel_dataframe.column_range.start_index,
excel_dataframe.column_range.end_index):
        wc = ws.cell(row_index + 1, row_index + 1)
        if wc.font.b:
            excel_dataframe.line_item_row = row_index
            is_line_item_row = True
            break
    if is_line_item_row:
        return
    excel_dataframe.line_item_row = line_item_list for excel_dataframe in excel_dataframes:
    line_item_list = _find_eligible_line_item_rows(excel_dataframe, pandas_dataframe, None, None, None)
    if line_item_list is not None:
        _detect_line_item_row(excel_dataframe, line_item_list)
```

Step1: sort the list of Table based on their row range

Step2: Create the empty list final_related_table_list

Step3: Iterate the elements of the sorted list

Step4: If the Table has line_item header

Consider it as table_with_header

Create the new list related_table_list

Add table to related_table_list

Step5: Iterate the next table till end of the list

If the table has no header then

If table within the column range of table_with_header

Add table to related_table_list

Else

Extend final_ related_table_list with related_table_list

Break the loop

And continue with step 3

Step6: Return the list of related final_related_table_list(which is list of list)

```python
def find_related_dataframes(excel_dataframes):
    # sort the dataframes with their row range
    excel_dataframes = sorted(excel_dataframes, key=lambda excel_dataframe:
        (excel_dataframe.row_range.start_index,
         excel_dataframe.column_range.end_index))

final_related_table_list = list()
    for i in range(0, len(excel_dataframes)):
        if excel_dataframes[i].line_item_row != -1:
            sub_related_table_list = list()
            sub_related_table_list.append(dataframe)
            if i == len(excel_dataframes) - 1:
                final_related_table_list.append(sub_related_table_list)
            for j in range(i + 1, len(excel_dataframes)):
                if excel_dataframes[j].line_item_row == -1 and \
                   excel_dataframes[j].column_range.start_index >= \
                   excel_dataframes[i].column_range.start_index and \
                   excel_dataframes[j].column_range.end_index <= \
                   excel_dataframes[i].column_range.end_index:
                    sub_related_table_list.append(dataframe)
                else:
                    final_related_table_list.append(sub_related_table_list)
                    break
    return final_related_table_list
```

| Table Match | Data Type | unique values | Series | Data length |
|---|---|---|---|---|
| Data Type | 1 | 0 | 0 | 0 |
| Unique values | 0 | 1 | 0 | 0 |
| Series | 0 | 0 | 1 | 0 |
| Data length | 0 | 0 | 0 | 1 |

FIG. 18

SPREADSHEET FLAT DATA EXTRACTOR

BACKGROUND

Unless otherwise indicated herein, the approaches described in this section are not prior art to the claims in this application and are not admitted to be prior art by inclusion in this section.

A table comprising rows and columns is a common way to organize and present related data. A table may represent a single, discrete flat data unit comprising such rows and columns.

Alternatively, a table may be a part of an overall entity such as a spreadsheet. There, one table may be intrinsically related to other flat units according to a larger schema.

SUMMARY

Embodiments relate to systems and methods that extract flat data units from a non-flat input, such as a spreadsheet comprising tables organized according to a hierarchy. First, the non-flat input is read (e.g., using pandas in combination with openpyxl) to create a flat dataframe comprising the content of the non-flat input. Next, individual flat data units (e.g., spreadsheet tables) are recognized and split from the dataframe based upon the appearance of blank rows and/or columns. Headers present in the flat data units are determined (e.g., based upon alphabetic cell text, bolded cell text, and/or early position of the cell in a column), and then connections between the flat data units are identified. Based upon the connections, individual flat data units are merged together. The resulting merged flat data units are subsequently available for consumption, for example user reports of content, and/or conversion to a new non-flat format (e.g., relational database schema).

The following detailed description and accompanying drawings provide a better understanding of the nature and advantages of various embodiments.

BRIEF DESCRIPTION OF THE DRAWINGS

FIG. 3 shows an example of a code snippet to read data from a spreadsheet.

FIG. 4 shows a simplified view of a dataframe.

FIG. 5 shows an example of a code snippet to read formatted data from a spreadsheet.

FIG. 6 shows a code snippet for processing an empty row or column.

FIG. 7 shows an empty row.

FIG. 8 shows an empty column.

FIG. 9 shows a code snippet for finding empty columns and storing their location.

FIG. 10 shows an example code snippet for creating a dataframe on the range of empty columns and main dataframe row range.

FIG. 11 shows an exemplary code snippet for processing a dataframe.

FIGS. 12-12A show an example spreadsheet.

FIG. 13 shows pseudocode for an example procedure.

FIG. 13A shows a code snippet for detecting the data type of cell values.

FIGS. 14A-B show a code snippet for extracting eligible rows to be line items.

FIG. 15 shows pseudocode for an example procedure.

FIG. 16 shows an exemplary code snippet for finding related data frames.

FIG. 17 shows an example of table matching.

FIG. 18 shows an example of a merger.

DETAILED DESCRIPTION

Described herein are methods and apparatuses that implement flat data extraction. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
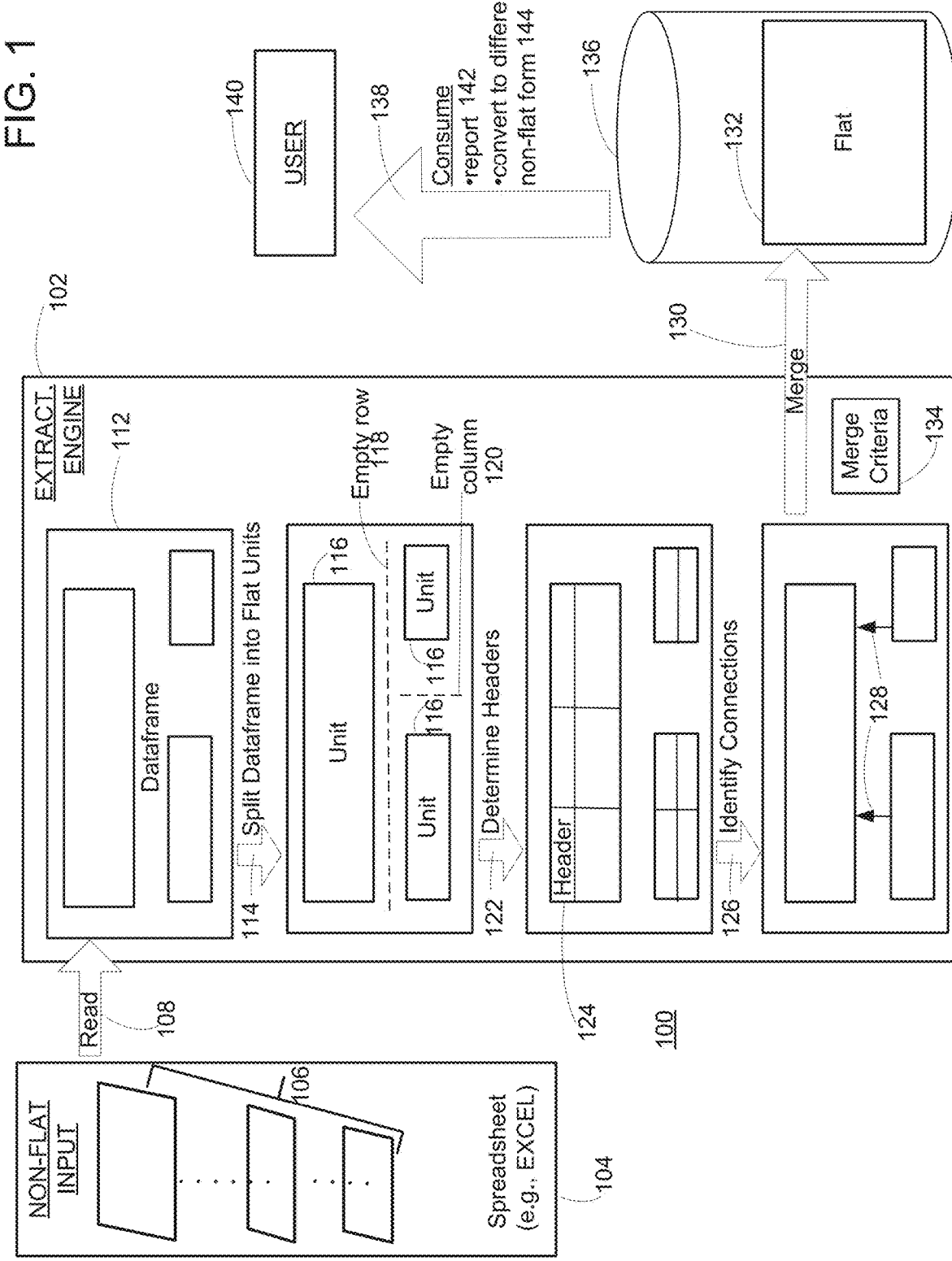
FIG. 1 shows a simplified diagram of a system according to an embodiment.

FIG. 1 shows a simplified view of an example system that is configured to implement flat data extraction according to an embodiment. Specifically, system 100 comprises a data extraction engine 102 that is configured to receive incoming data 104.

This incoming data is in the form of a spreadsheet that is organized according to a hierarchical structure 106. That is, the data is not simply organized as a flat table in rows and columns. Such non-flat input may be a spreadsheet, or may be emails, PDFs, text documents, or other formats.

According to a first processing phase 108, the extraction engine reads the non-flat data in order to produce a dataframe 112. This dataframe includes the data from the spreadsheet, but in a flat, non-hierarchical format.

As is described in detail below, this reading of the non-flat spreadsheet to produce the flat dataframe, may efficiently be performed by resorting to certain specialized functionality. In specific embodiments, this can include the use of pandas in combination with openpyxl.

In a next processing phase 114, individual data units 116 are identified from the flat dataframe. These data units may comprise discrete tables that are present within the spreadsheet.

In particular, such splitting of the dataframe into individual flat data units may be accomplished by recognizing empty rows 118 and/or columns 120 within the datasheet. These empty rows/columns are understood to delineate individual spreadsheet tables from one another.

In a next phase of processing, the extraction engine seeks to determine 122 column headers 124 within the individual flat data units. Such headers may be explicitly apparent from the two-dimensional structure of the data unit.

Alternatively, column headers may need to be inferred from characteristics of the nature of a table cell. Examples of such characteristics can include but are not limited to alphabetic content, bold font, and/or position as an early row within a column.

Then, based upon recognized headers as well as other available information, during a next processing phase 126 the extraction engine seeks to identify connections 128 between the various flat data units that have been split from the dataframe.

These connections can be identified on the basis of the headers. Moreover, connections between flat data units can also be identified on the basis of other factors, for example table metadata and physical proximity between flat data units within the dataframe.

Having identified connections between the flat data units, in a next processing phase 130 the data extraction engine then operates to merge those related flat data units into a fewer number of merged flat data units 132. This merger may be based upon merge criteria 134, for example calculation of a matching percentage between the flat data units.

The merged flat data units are then stored in a database 136, for future consumption 138 by a user 140. Such consumption can involve the generation of report(s) 142 regarding the merged flat data units and their respective content and/or metadata.

The merged flat data units can also be consumed in a process of converting 144 to a hierarchical structure different from the original spreadsheet. Such a hierarchical structure may be a particular (relational) database schema.

Figure 2:
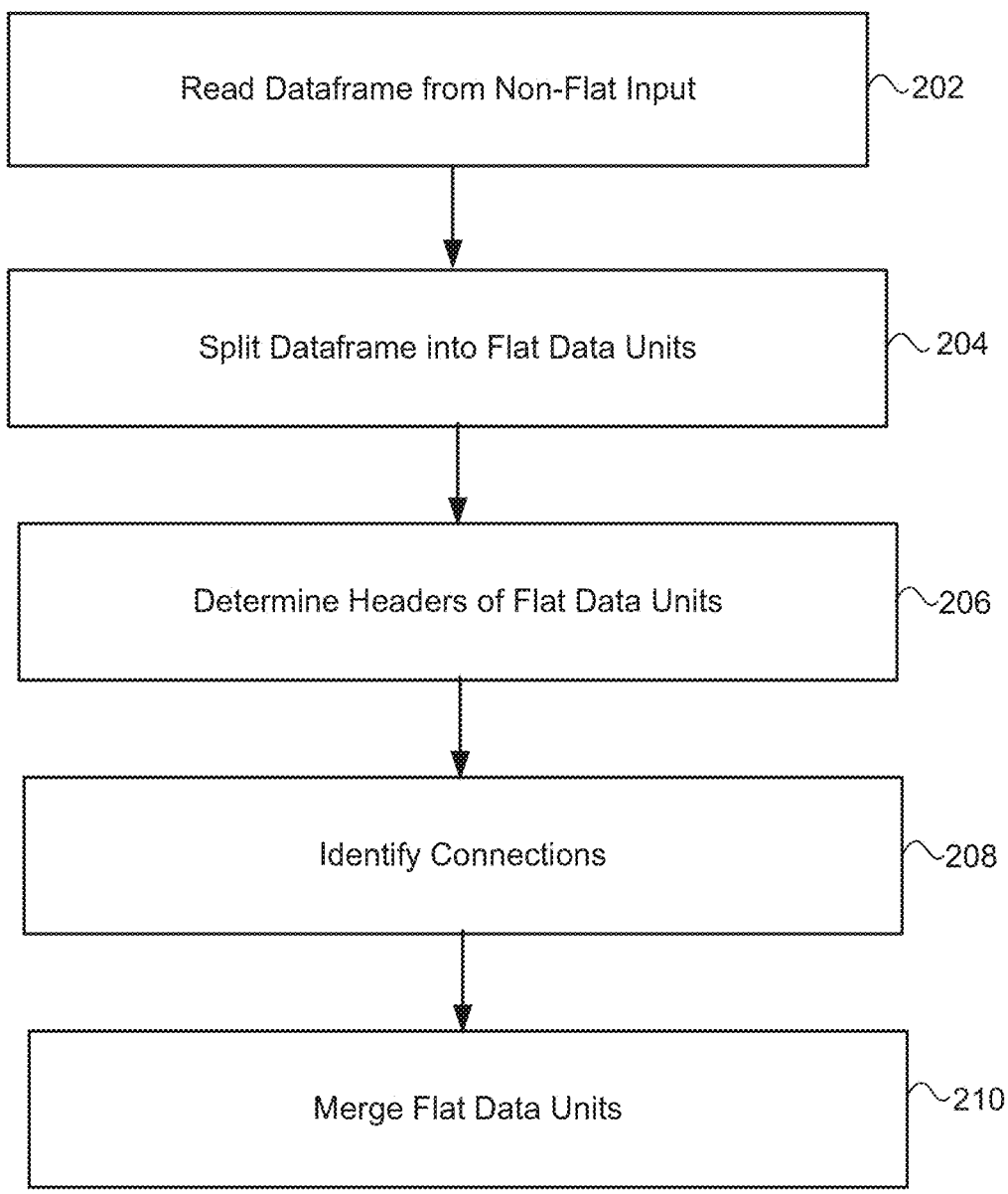
FIG. 2 shows a simplified flow diagram of a method according to an embodiment.

FIG. 2 is a flow diagram of a method 200 according to an embodiment. At 202, a non-flat input (e.g., a spreadsheet) is read to produce a flat dataframe.

At 204, the dataframe is split into a plurality of flat data units. This splitting may be based upon the presence of empty rows and/or columns.

At 206, headers of the flat data units are determined. At 208, connections between the flat data units are determined (based, e.g., upon headers).

At 210, two flat data units are merged together to form a merged flat data unit. This merging may be determined based upon merge criteria that considers a percentage matching.

Systems and methods according to embodiments, may avoid one or more issues. In particular, manually extracting flat data units and establishing connections between them, can be difficult and lead to errors. Embodiments avoid the time, effort, and expense of manually extracting flat data units such as tables from non-flat input.

Further details regarding extraction of flat data units according to various embodiments, are now provided in connection with the following example.

EXAMPLE

The system of this exemplary embodiment relates to processing of an invoice within the EXCEL spreadsheet available from Microsoft Corporation of Redmond, Wash. In such an EXCEL spreadsheet there are multiple flat data units present.

Finding, relating, and merging of those flat data units in order to extract a connected table can pose a challenge, for several possible reasons. One reason is that reading the spreadsheet may be time consuming. Another mason is that a spreadsheet can have any number of tables, and identifying the valid tables from the spreadsheet is required.

In order to address these challenges, embodiments utilize python libraries in order to read and write the spreadsheet. In particular, this exemplary embodiment reads the spreadsheet using both Python Data Analysis Libraries (pandas) and openpyxl.

Processing is taken care of with the help of pandas. The fastest way to read the spreadsheet is with pandas as it works on C bottleneck libraries. Pandas read data in binary format, and covert data into Numpy array.

The Read_excel method of pandas is used to read the spreadsheet and convert it to the dataframe. This approach intelligently reads the spreadsheet until the maximum row and maximum column of the EXCEL spreadsheet.

FIG. 3 shows an example of a code snippet to read data from a spreadsheet and convert it into a dataframe. FIG. 4 shows a simplified view of a dataframe.

Formatting is taken care with the openpyxl python library. In particular, after processing with pandas, coordinates of dataframes or flat data in spreadsheet are stored for each flat data unit. The code snippet of FIG. 5 shows that only those coordinates from the openpyxl worksheet are processed to find the formatting of spreadsheet cells to highlight header information.

A separate challenge to extracting flat data table units from a spreadsheet, arises from identifying how many flat data units are present in the spreadsheet. In particular, the spreadsheet file can contain unstructured data/flat data as well, in which case identifying the tables and the number of columns may not be straightforward.

In order to address this challenge, embodiments provide a procedure for finding a flat data unit. Specifically, after reading the spreadsheet the output will be the main dataframe—the entire flat data present in the EXCEL spreadsheet.

Then, this main dataframe that is read, is put in the queue data structure. This is shown in FIG. 6.

In the intersection of the three separated connected units, there will be either a column empty or a row empty. FIG. 7 shows an empty row. FIG. 8 shows an empty column.

Embodiments thus find the empty columns in the main dataframe, and stores their location in one list. This is shown in FIG. 9.

Next, the procedure splits the connected units on the basis of the location of empty columns. The procedure creates a dataframe on the range of empty columns and main dataframe row range. This is shown in FIG. 10.

Now, embodiments again put the split dataframes location into the queue. As the split dataframes in the queue are split by column, there is no need to check the empty column. Rather, the procedure can just check the empty row in every dataframe one by one.

The procedure continues to store split dataframes location to the queue on the basis of separation. This is run until the queue is empty.

After the queue is empty, the output will be the locations of all the connected units. It is noted that there may not be a need to store connected units in the memory.

Rather, locations of connected units can be accessed using the panda ".iloc" function. This function is shown in the particular code snippet of FIG. 11, as well as others.

As one example, consider the spreadsheet content shown in FIGS. 12-12A. Processing according to embodiments reveals this spreadsheet to have four independent tables: table 1, table 2, table 3, table 4.

Other challenges to extracting flat data table units from a spreadsheet, arise from the need to identifying table header fields irrespective of language and format. For example, table headers may be in any language, may not be bold, and headers need not be in the first row but rather may lie anywhere in first few rows.

In order to address these challenges, embodiments iterate the first few rows of the table based on the table length. For each row, it is checked:
if the row has 75% of values,
if values are alphabets,
if the values are bold.

Rows matching any of these criteria are noted. Then, the row is selected as a line item row of the table based on highest criteria matched row FIG. 13 shows a code snippet for detecting the data type of cell values. FIG. 14 shows a code snippet for extracting eligible rows to be line item.

Returning to the specific example of FIGS. 12-12A, processing in the above manner reveals only the table 1 as having a line item header (i.e., located at row number 5).

Still other challenges to extracting flat data table units from a spreadsheet, arise from identifying related tables within a spreadsheet. In particular, tables with no headers may be the continuation of a previous table. It may be required to identify the possible combinations of a table without headers that can be merged with a table having headers.

To address these challenges, embodiments perform specific steps to find related tables. Then, the related table without the header can be merged to the table with the header.

As a main condition in this exemplary embodiment, the table without the header should be below the table with header. And, the column range of the table without a header should be within the column range of table with a header.

FIG. 16 shows an exemplary procedure. Here, the first element of sub list is always the table with line item header.

The list has tables that have no header. These could be merged with the table that has header. FIG. 17 shows a code snippet for finding related dataframes.

Returning again to the particular example of FIG. 12, table 2, table3, and table 4 are related to table 1. Hence, tables 2, 3, and 4 can be merged to table 1 if a merging criteria is satisfied.

Yet other challenges to extracting flat data table units from a spreadsheet, relate to the existence of metadata. Specifically, each column of a table may have associated metadata. That metadata can be used to determine, for example:
the data type,
are the column values unique?
are the column values a series?
minimum and maximum data length of the column values.

Moreover, merging tables without headers to tables having headers, may be based on a calculation performed using the meta data of each column and overall table confidence calculation.

In order to address these issues, embodiments may perform processing according to a series of modules (Module1-Module4 in this example) in order to merge the table without the header to the table with the header.

In a Module1, metadata of the table is obtained. In this module, the detailed information of the table is found.

For example, for each column of the table the following are computed:
Data Type;
Data length (minimum and maximum data length);
list of Unique Values:
are values of column series.

Note: Series are not checked if the column values are unique and vice-versa. FIG. 17 shows an example of table matching.

A next Module2 iterates the list of lists obtained from the related table finder. The first table of the sub list is always the table with line item headers.

The meta data for each column of the first table is calculated and stored as: main_table_metadata. The meta data for each column of the rest of the tables in the sub list is calculated.

Then, a Module3 compares the metadata. In particular, the meta data of each columns of the sub tables is compared with the metadata of the corresponding columns of main_table_metadata.

How many columns of the sub table match with the main table metadata, is calculated. If the column match percent is more than 75%, then merge the sub table with main table; else reject the sub table.

This step is repeated for all sub tables of the sub list. In this manner, the Module3 returns the list of tables with all tables having a header.

Returning again to the example of FIGS. 12-12A, processing with the Modules1-3 reveals the table 4 to be an invalid table. Accordingly, table 4 is removed.

Then, the table 2 and the table 3 FIGS. 12-12A are merged into table 1. The resulting merged table is shown in FIG. 18.

Returning now to FIG. 1, there the particular embodiment is depicted with the engine responsible for flat table unit extraction as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 19:
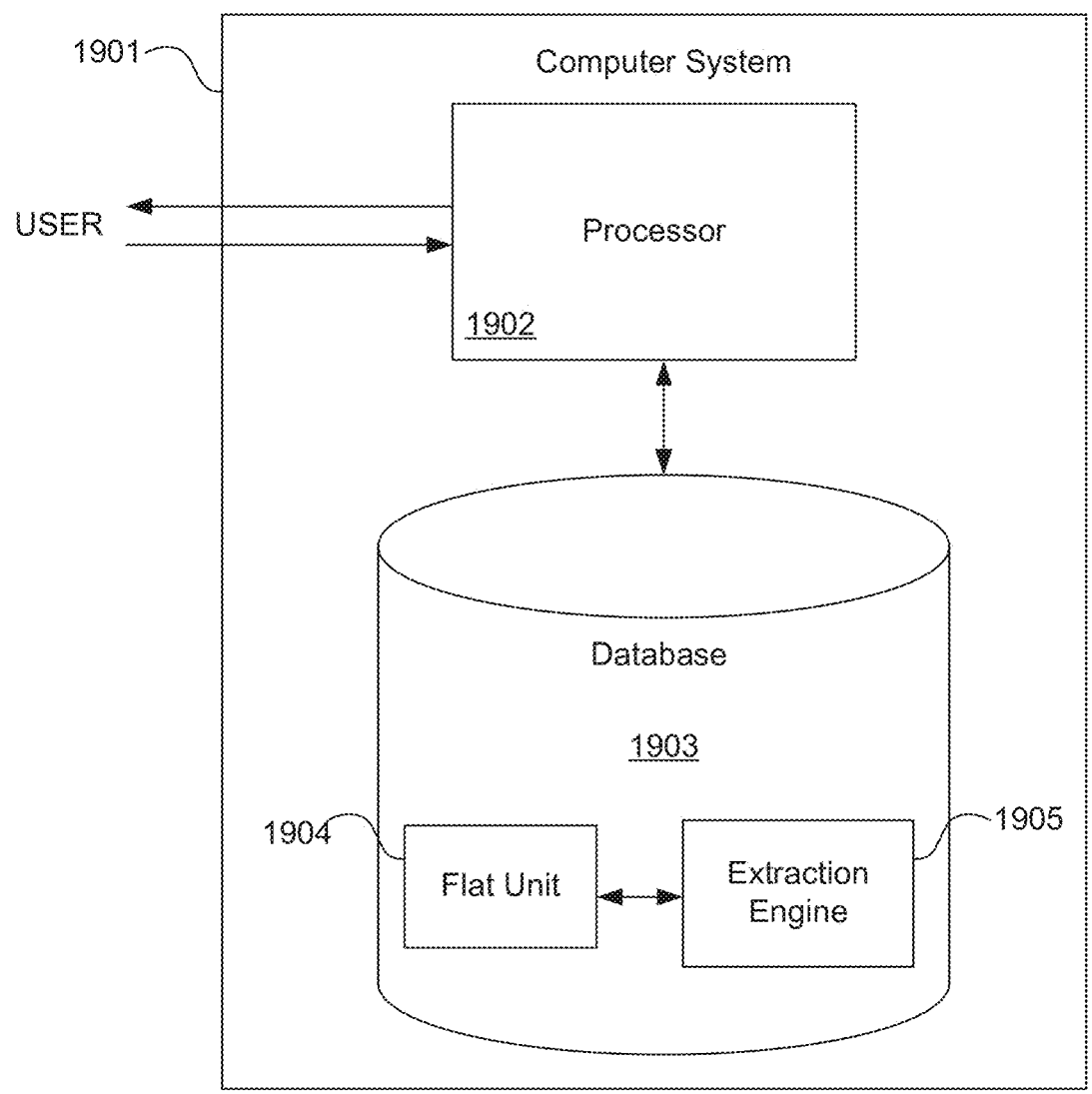
FIG. 19 illustrates hardware of a special purpose computing machine configured to implement extraction of flat data units according to an embodiment.

Thus FIG. 19 illustrates hardware of a special purpose computing machine configured to implement flat data extraction according to an embodiment. In particular, computer system 1901 comprises a processor 1902 that is in electronic communication with a non-transitory computer-readable storage medium comprising a database 1903. This computer-readable storage medium has stored thereon code 1905 corresponding to an extraction engine. Code 1904 corresponds to a flat data unit. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 20:
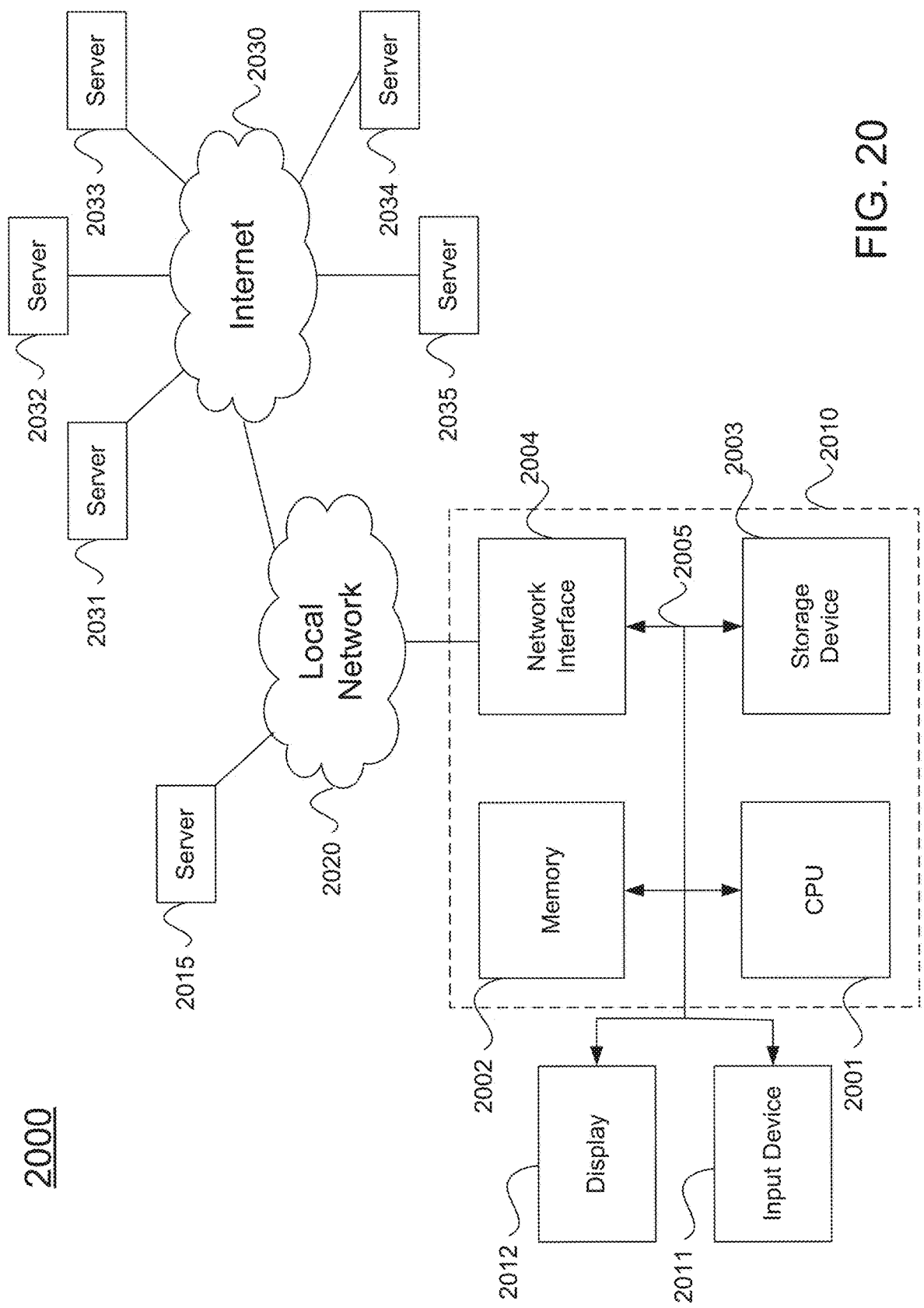
FIG. 20 illustrates an example computer system.

An example computer system 2000 is illustrated in FIG. 20. Computer system 2010 includes a bus 2005 or other communication mechanism for communicating information, and a processor 2001 coupled with bus 2005 for processing information. Computer system 2010 also includes a memory 2002 coupled to bus 2005 for storing information and instructions to be executed by processor 2001, including information and instructions for performing the techniques described above, for example. This memory may also be used for storing variables or other intermediate information during execution of instructions to be executed by processor 2001. Possible implementations of this memory may be, but are not limited to, random access memory (RAM), read only memory (ROM), or both. A storage device 2003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2003 may include source code, binary code, or software files for performing the techniques above, for example. Storage device and memory are both examples of computer readable mediums.

Computer system 2010 may be coupled via bus 2005 to a display 2012, such as a Light Emitting Diode (LED) or liquid crystal display (LCD), for displaying information to a computer user. An input device 2011 such as a keyboard and/or mouse is coupled to bus 2005 for communicating information and command selections from the user to processor 2001. The combination of these components allows the user to communicate with the system. In some systems, bus 2005 may be divided into multiple specialized buses.

Computer system 2010 also includes a network interface 2004 coupled with bus 2005. Network interface 2004 may provide two-way data communication between computer system 2010 and the local network 2020. The network interface 2004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2004 sends and receives electrical, electromagnetic, or optical signals that carry digital data streams representing various types of information.

Computer system 2010 can send and receive information, including messages or other interface actions, through the network interface 2004 across a local network 2020, an Intranet, or the Internet 2030. For a local network, computer system 2010 may communicate with a plurality of other computer machines, such as server 2015. Accordingly, computer system 2010 and server computer systems represented by server 2015 may form a cloud computing network, which may be programmed with processes described herein. In the Internet example, software components or services may reside on multiple different computer systems 2010 or servers 2031-2035 across the network. The processes described above may be implemented on one or more servers, for example. A server 2031 may transmit actions or messages from one component, through Internet 2030, local network 2020, and network interface 2004 to a component on computer system 2010. The software components and processes described above may be implemented on any computer system and send and/or receive information across a network, for example.

Example 1. Computer implemented system and methods comprising:
receiving input data in a non-flat format;
reading the input data to produce a flat dataframe;
splitting the dataframe into a first flat data unit and a second flat data unit based upon a separation in the flat dataframe;
determining a header of the first flat data unit;
identifying a connection between the first flat data unit and the second flat data unit; merging the first flat data unit and the second flat data unit to produce a merged flat data unit; and
storing the merged flat data unit in a database of a non-transitory computer readable storage medium.

Example 2. The computer implemented system and method of Example 1 wherein the splitting is based upon at least one of an empty row and an empty column as the separation.

Example 3. The computer implemented systems and methods of Examples 1 or 2 wherein:
the non-flat format comprises a spreadsheet;
the first flat data unit comprises a first table of the spreadsheet; and
the second flat data unit comprises a second table of the spreadsheet.

Example 4. The computer implemented systems and methods of Examples 1, 2, or 3 wherein determining the header references at least one of:
alphabetic content;
a bold font; and
an early position of a cell within a column of the first flat data unit.

Example 5. The computer implemented systems and methods of Examples 1, 2, 3, or 4 wherein the merging is based upon a percentage match between the first flat data unit and the second flat data unit.

Example 6. The computer implemented systems and methods of Example 5 wherein the percentage match is based upon at least one of: data type, data length, unique values, and series values.

Example 7. The computer implemented systems and methods of Examples 1, 2, 3, 4, 5, or 6 wherein the merging references a first location of the first flat data unit in the dataframe, and a second location of the second flat data unit in the dataframe.

Example 8. The computer implemented systems and methods of Examples 1, 2, 3, 4, 5, 6, or 7 wherein:

Example 9. The computer implemented systems and methods of Examples 1, 2, 3, 4, 5, 6, 7, or 8 wherein the reading utilizes a combination of a Python Data Analysis Library (panda) and openpyxl.

Example 10. The computer implemented systems and methods of Examples 7 or 9 wherein the first location and the second location are obtained using an .iloc function of panda.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
 receiving input data in a non-flat format;
 reading the input data to produce a flat dataframe;
 splitting the dataframe into a first flat data unit and a second flat data unit based upon a separation in the flat dataframe;
 determining a header of the first flat data unit by referencing at least one of alphabetic content, and a font;
 identifying a connection between the first flat data unit and the second flat data unit;
 merging the first flat data unit and the second flat data unit to produce a merged flat data unit; and
 storing the merged flat data unit in a database of a non-transitory computer readable storage medium,
 wherein,
 the merging is based upon a percentage match between the first flat data unit and the second flat data unit, and
 the percentage match is based upon series values.

2. A method as in claim 1 wherein the reading utilizes a combination of a Python Data Analysis Library (panda) and openpyxl.

3. A method as in claim 1 wherein the splitting is based upon at least one of an empty row and an empty column as the separation.

4. A method as in claim 1 wherein:
 the non-flat format comprises a spreadsheet;
 the first flat data unit comprises a first table of the spreadsheet; and the second flat data unit comprises a second table of the spreadsheet.

5. A method as in claim 1 wherein determining the header references a bold font.

6. A method as in claim 1 wherein the merging references a first location of the first flat data unit in the dataframe, and a second location of the second flat data unit in the dataframe.

7. A method as in claim 6 wherein:
the reading utilizes a Python Data Analysis Library (panda); and
the first location and the second location are obtained using an .iloc function of panda.

8. A method as in claim 1 wherein the percentage match is based upon data length.

9. A method as in claim 1 wherein the database comprises an in-memory database, and at least one of the reading, splitting, determining, identifying, and merging are performed by an in-memory database engine of the in-memory database.

10. A non-transitory computer readable storage medium embodying a computer program for performing a method, said method comprising:
receiving a spreadsheet;
reading the spreadsheet to produce a flat dataframe;
splitting the dataframe into a first flat data unit comprising a first spreadsheet table and a second flat data unit comprising a second spreadsheet table, based upon a separation in the flat dataframe;
determining a header of the first spreadsheet table by referencing at least one of alphabetic content of a cell in the first spreadsheet table, and a font of a cell in the first spreadsheet table;
identifying a connection between the first spreadsheet table and the second spreadsheet table;
merging the first spreadsheet table and the second spreadsheet table to produce a first merged spreadsheet table; and
storing the merged spreadsheet table in a database of a non-transitory computer readable storage medium, wherein,
the merging is based upon a percentage match between the first flat data unit and the second flat data unit, and
the percentage match is based upon series values.

11. A non-transitory computer readable storage medium as in claim 10 wherein:
the reading utilizes a combination of a Python Data Analysis Library (panda) and openpyxl; and
the merging references a first location of the first spreadsheet table in the dataframe, and a second location of the second spreadsheet table in the dataframe, the first location and the second location obtained using an .iloc function of panda.

12. A non-transitory computer readable storage medium as in claim 10 wherein the splitting is based upon at least one of an empty row and an empty column as the separation.

13. A non-transitory computer readable storage medium as in claim 10 wherein determining the header references a bold font of a cell in the first spreadsheet table.

14. A non-transitory computer readable storage medium as in claim 10 wherein the merging is based upon the percentage match between the first spreadsheet table and the second spreadsheet table of data length.

15. A computer system comprising:
one or more processors;
a software program, executable on said computer system, the software program configured to cause an in-memory database engine of an in-memory database to:
receive input data in a non-flat format;
read the input data to produce a flat dataframe;
split the dataframe into a first flat data unit and a second flat data unit based upon a separation in the flat dataframe;
determine a header of the first flat data unit by referencing at least one of alphabetic content of a cell in the first spreadsheet table, and a font of a cell in the first spreadsheet table;
identify a connection between the first flat data unit and the second flat data unit;
merge the first flat data unit and the second flat data unit to produce a merged flat data unit; and
store the merged flat data unit in the in-memory database, wherein,
the merge is based upon a percentage match between the first flat data unit and the second flat data unit, and
the percentage match is based upon series values.

16. A computer system as in claim 15 wherein the in-memory database engine is configured to:
read the input data utilizing a combination of a Python Data Analysis Library (panda) and openpyxl; and
perform the merge referencing a first location of the first spreadsheet table in the dataframe, and a second location of the second spreadsheet table in the dataframe, the first location and the second location obtained using an .iloc function of panda.

17. A computer system as in claim 15 wherein the in-memory database engine is configured to perform the split based upon at least one of an empty row and an empty column as the separation.

18. A computer system as in claim 15 wherein the in-memory database engine is configured to determine the header by referencing a bold font of a cell in the first spreadsheet table.

19. A computer system as in claim 15 wherein the in-memory database engine is configured to perform the merge based upon the percentage match between the first spreadsheet table and the second spreadsheet table of data length.

* * * * *